April 16, 1968 — C. A. GRAN — 3,378,177

FOOD CONTAINER WITH PLURAL OPENINGS

Filed Sept. 23, 1966 — 4 Sheets-Sheet 1

Inventor
Carl A. Gran
By: Stone, Zummer &
Livingston Attys.

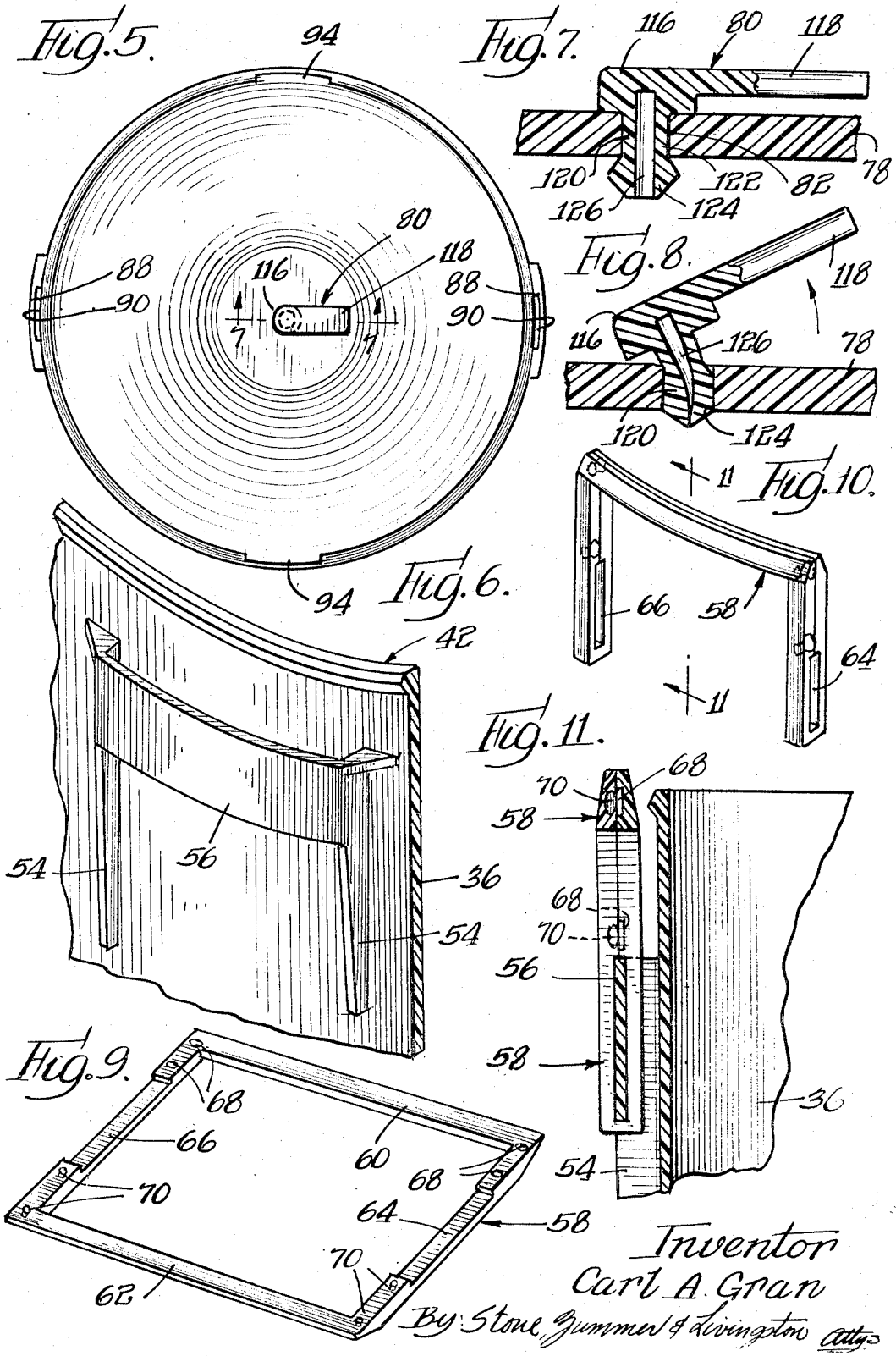

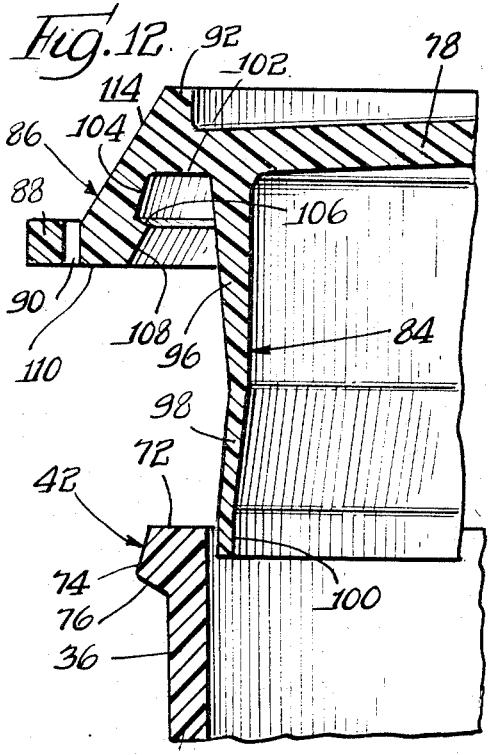
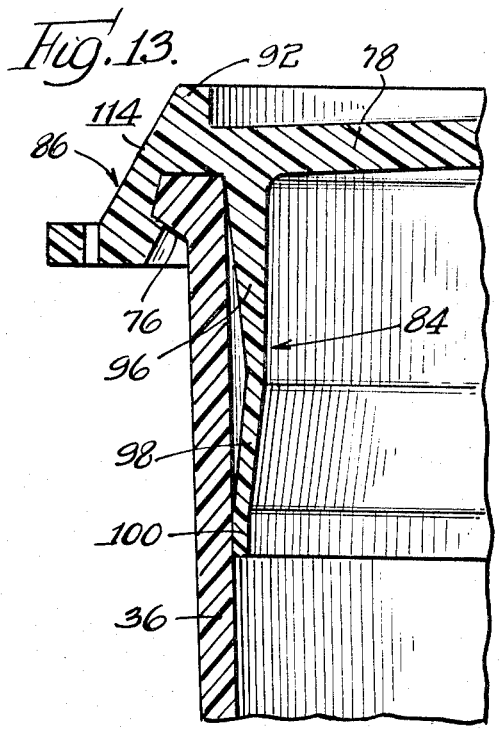
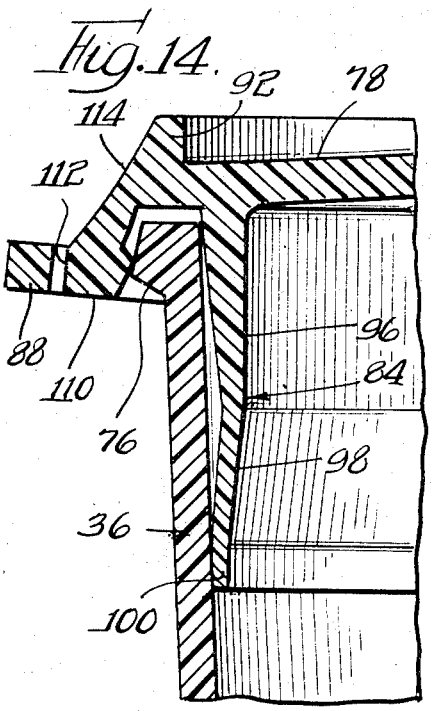
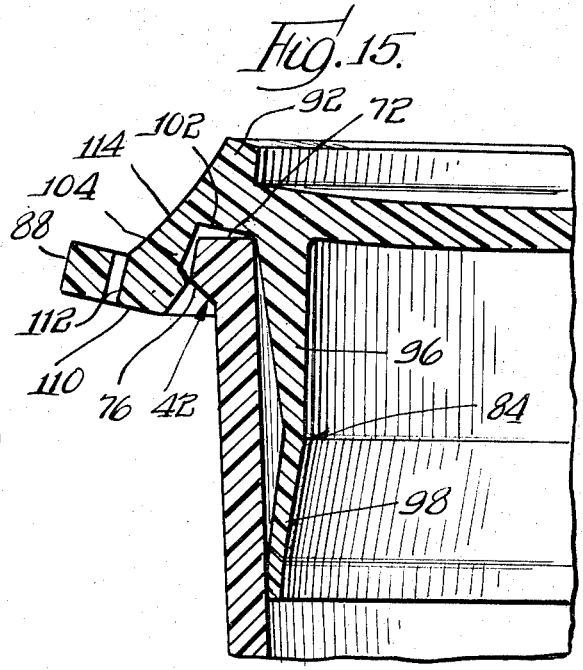

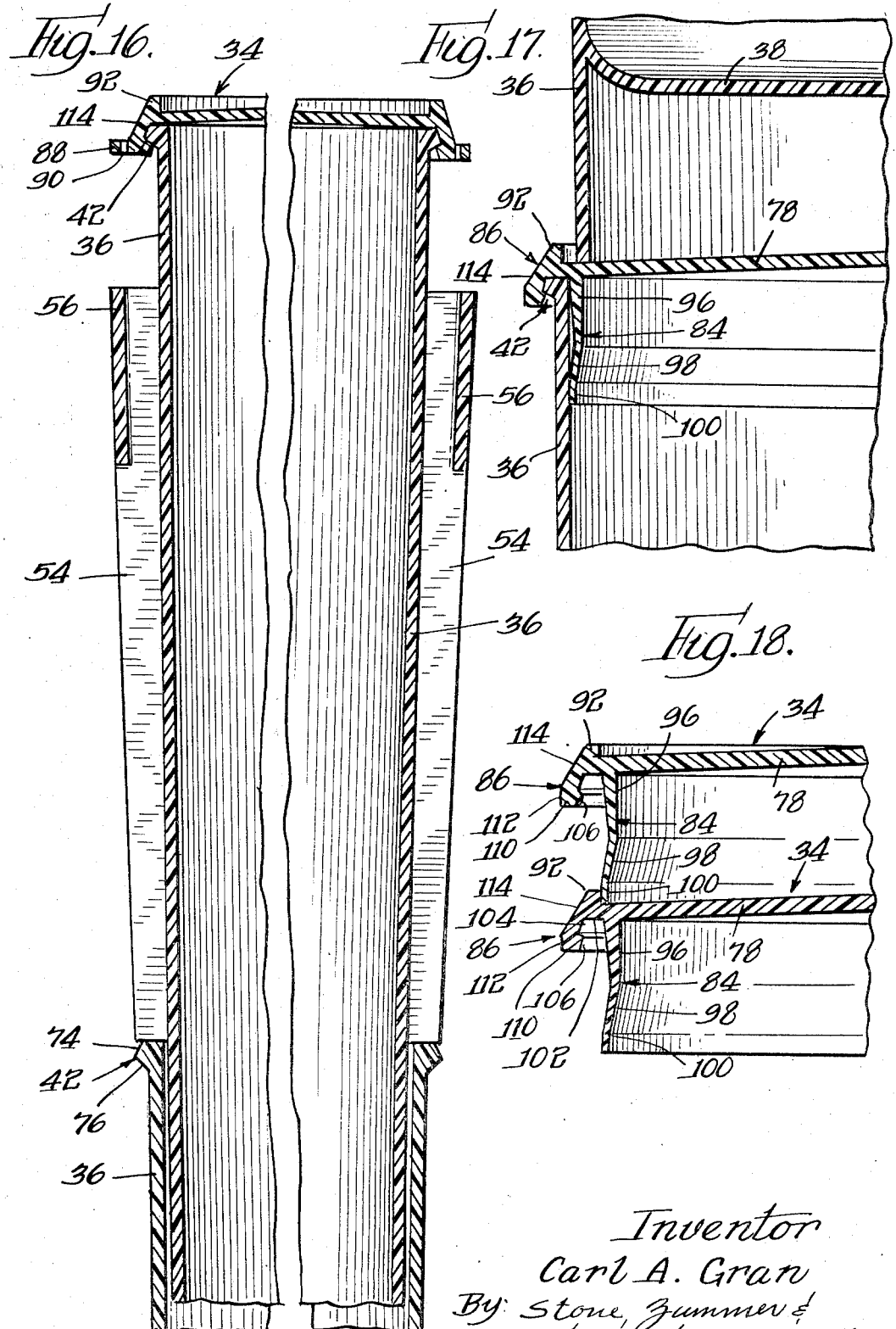

United States Patent Office

3,378,177
Patented Apr. 16, 1968

3,378,177
FOOD CONTAINER WITH PLURAL OPENINGS
Carl A. Gran, Arlington Heights, Ill., assignor, by mesne assignments, to John R. Scherer Co., Inc., and J. & E. Leasing Co.
Filed Sept. 23, 1966, Ser. No. 581,495
14 Claims. (Cl. 222—482)

ABSTRACT OF THE DISCLOSURE

A container including a flexible vessel having a conical side wall, the open end of the vessel being the larger end and having a lock ring formed integral with the side wall, and a stacking stop formed integral with the side wall. A flexible cover including a closure having an annular conical seal wall, a conical seal support formed integral with the seal wall and an annular seal formed integral with the seal support engageable with the interior surface of the side wall. An exterior seal is formed integral with the closure and engageable with the lock ring.

---

This invention relates to a food container and more particularly to a container which is particularly adapted for holding easily perishable foods, such as milk, ice cream mix, cream, condensed milk, sour cream, cottage cheese, butter, milk product, milk powder, fruit juices, water, and the like, and which container may be easily cleaned, is restraint to corrosion, and may be sealed for carrying milk products in conformance with health regulations.

A conventional method of packaging large quantities of certain food products which are flowable is to package them in quantities of approximately five gallons. In the dairy industry, five-gallon containers are used for milk, ice cream mix, and a large variety of other products. Five-gallon containers are used in other food industries, but are not used as generally as in the dairy industry. In the food industry and especially in the dairy industry, the five-gallon bulk containers must be thoroughly cleaned after each usage to make certain that no bacteria is introduced into the food product. Conventionally, the containers are scrubbed and then steam cleaned to remove practically all of the bacteria from the interior of the container. The conventional containers in the dairy industry are either stainless steel containers or plated steel containers, and these containers are of course reused over a substantial period of time. In the handling of the containers, the containers are often dented so that the dairy operators must have the dents removed to give a full quantity of milk product. This problem is especially true with the stainless steel containers, which are thin walled in order to minimize the price of the containers. Both the stainless steel and the plated containers do not have a good seal in the metal-to-metal seal of the cover with the vessel of the container. Customarily, a parchment paper is placed in the opening of the vessel so that the parchment paper acts as a gasket. However, in some instances the metal is distorted sufficiently due to usage so that the gasket material fails to create a perfect seal. It is therefore one of the principal objects of the herein disclosed invention to provide an improved container construction which is particularly well adapted to hold bulk quantities of food products in which the cover-to-vessel seal does not require a gasket material.

It is another object of the present invention to provide an improved construction for a food container wherein the parts of the container are elastic in order to provide a container which may be readily sealed, is durable and may not be readily dented.

It is a further object of the present invention to provide an improved construction of a food container wherein the cover of the container is domed in order to facilitate disengagement of the cover from the vessel.

It is a still further object of this invention to provide an improved container construction wherein containers may be stacked one on top of another.

It is a further object of the herein disclosed invention to provide a food container in which a liquid food product may be readily dispensed from the container.

It is still another object of the instant invention to provide an improved container construction wherein the parts of the container may be readily conveniently molded from a plastic product.

It is still another object of the instant invention to provide an improved cover construction in which the covers may be conveniently stacked one on top of another.

It is still another object of the present invention to provide an improved vessel construction wherein the vessels may be readily nested together.

Other objects and uses of this invention will become readily apparent to those skilled in the art upon a perusal of the following specification in light of the accompanying drawings in which:

FIGURE 5 is a plan view of the container shown in FIGURE 1;

FIGURE 6 is an enlarged perspective view of a stacking stop which is an integral part of a vessel which constitutes a portion of the container shown in FIGURE 1;

FIGURE 7 is a cross-sectional view of a vent plug taken on line 7—7 of FIGURE 5;

FIGURE 8 is a cross-sectional view similar to FIGURE 7, but showing the vent plug in a partially removed attitude;

FIGURE 9 is a perspective view of a removable handle adapted for connection to the stacking stop shown in FIGURE 6;

FIGURE 10 is a perspective view of the handle shown in FIGURE 9, but showing the handle in a closed or locked attitude;

FIGURE 11 is a cross-sectional view taken on line 11—11 of FIGURE 10, but showing the handle connected to the stacking stop of FIGURE 6;

FIGURE 12 is an enlarged cross-sectional view showing a portion of the cover of the container of FIGURE 1 in an attitude for engagement with the vessel of the container of FIGURE 1;

FIGURE 13 is a cross-sectional view similar to FIGURE 12, but showing the cover in an attitude in which the cover is sealingly locked to the vessel;

FIGURE 14 is a cross-sectional view similar to FIGURE 13, but showing the cover in a partially removed attitude;

FIGURE 15 is a cross-sectional view similar to FIGURE 13, but showing a portion of the cover depressed in order to disengage partially the cover from the vessel;

FIGURE 16 is a fragmentary cross-sectional view of a portion of two vessels showing one vessel nesting in another vessel;

FIGURE 17 is a fragmentary cross-sectional view of a portion of two containers showing one container stacked on top of another container; and FIGURE 18 is a fragmentary cross-sectional view showing one cover stacked on top of another.

Figure 1:
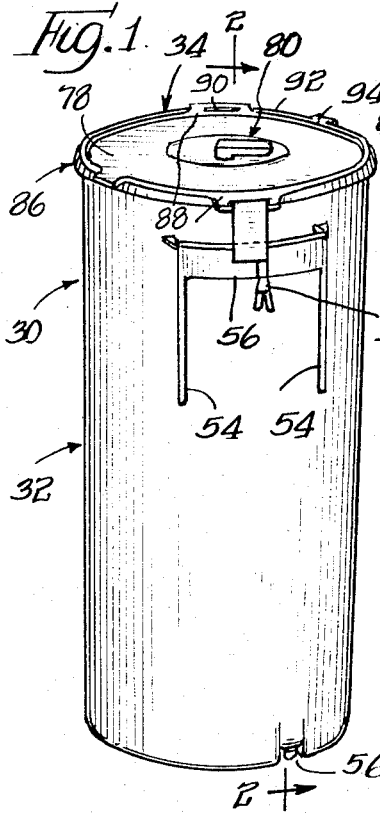
FIGURE 1 is a perspective view of a food container embodying the herein disclosed invention.

Referring now to the drawings and especially to FIGURE 1, a food container embodying the herein disclosed invention and generally indicated by numeral 30 is shown therein. The food container 30 consists of a flexible unitary molded vessel 32 which has a flexible unitary molded cover 34 sealingly mounted on the upper edge of the vessel.

The vessel 32 is a molded unitary vessel, which in this instance is made of polypropylene. However, it is to be expressly understood that any other suitable plastic material may be used, which plastic material has sufficient strength to hold the materials in the container and has sufficient elasticity for operation of the seal, as described hereinafter. It should also be noted that the material must be one which is acceptable by the United States Public Health Service as a food container.

The vessel 32 generally consists of a conical side wall 36 which is truncated. Formed integral with the side wall is a bottom 38 and the bottom is positioned adjacent to the smaller end of the side wall as may be best seen in FIGURE 2. A pair of identical opposed stacking stops 40 is formed integral with the exterior surface of the side wall, adjacent to the upper portion thereof. Formed integral with the larger or upper end of the side wall 36 is a lock ring 42 which is adapted to receive sealingly the cover 34, as described in detail hereinafter.

The bottom 38 has a tapered spout 44 formed integral with the bottom, adjacent to the side wall 36. The spout 44 communicates with the interior of the vessel to provide a means for draining the vessel. A tube flange 46 is formed integral with the bottom 38 and is positioned adjacent to the side wall. A tube lock flange 48, which is also formed integral with bottom 38, is positioned adjacent to the side wall 36, and is spaced from the tube flange 46. A conventional rubber tube 50 is sealingly mounted on the spout 44 and is placed between the tube flange 46 and the side wall 36 to be positioned therein and is also positioned between the tube lock flange 48 and the side wall 36 to seal closed the tube. As is conventional in rubber tube construction used in conjunction with bulk milk containers, the tube 50 has one end sealed closed so that fluid does not escape from the vessel during transportation of the vessel. It should be further noted that the tube is squeezed between the tube lock flange 48 and the side wall so that the tube is securely held adjacent to the bottom 38 as well as being sealed between the flange and side wall. The side wall 36 contains a slot 52 in its smaller or lower end adjacent to spout 44 to provide a means for positioning the tube exteriorly of the side wall.

Each stacking stop 40 is identical to the other stacking stop, as mentioned above. Each stacking stop includes a pair of identical ribs 54, which ribs are formed integral with the exterior of side wall 36. Formed integral with the ribs 54 is a cross bar 56, which extends between the ribs and is spaced from the side wall 36. The cross bars 56 provide a dual function as will become apparent hereinafter.

As may be best seen in FIGURES 9, 10, and 11, a handle 58 is removably connected to the cross bar 56. The handle 58 is a single piece of molded polypropylene. However, any other suitable plastic material may be used. The handle 58 includes a U-shaped apertured half 60 which has its arms of the U formed integral with a U-shaped pronged half 62. The arms of the halves 60 and 62 contain recesses 64 and 66 which are adapted to receive the cross bar 56. The apertured half 60 contains four apertures 68, and the pronged half 62 includes four prongs 70 which are mateable with the apertures 68. The handle 58 is positioned on the vessel 32 so that the cross bar 56 is in the recesses 64 and 66 and the prongs 70 are snapped into the apertures 68, thereby securing the handle to the vessel. It may be readily appreciated that the handle 58 may be easily removed by simply pulling apart the halves of the handle and disengaging the handle from the cross bar.

As may be best seen in FIGURES 12 through 15, the lock ring 42 is formed integral with the upper or wider end of the side wall 36. The lock ring 42 includes a ring-like plane surface 72 in which the surface of the plane is perpendicular to the axis of the conical side wall 36. An upper conical surface 74 has its smaller end intersecting the plane surface 72 at an obtuse angle. A lower conical surface 76 has its larger end intersecting the upper conical surface 74 at an obtuse angle and its smaller end intersects the side wall 36.

Figure 2:
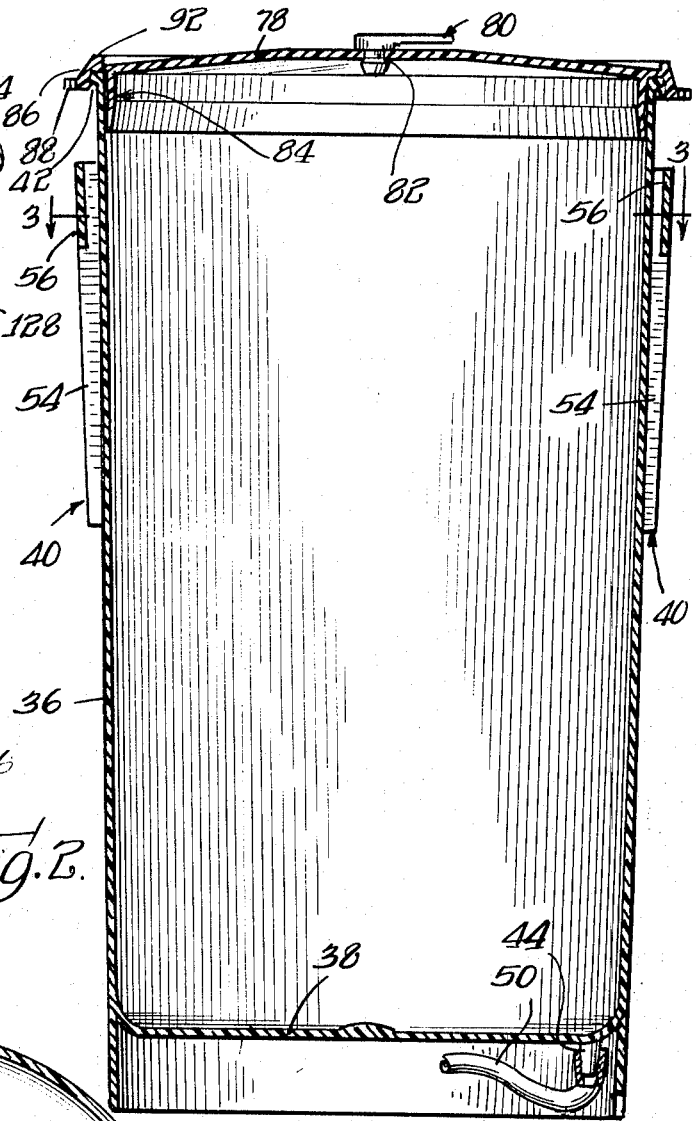
FIGURE 2 is an enlarged cross-sectional view taken on line 2—2 of FIGURE 1, showing the interior construction of the subject container.
Figure 3:
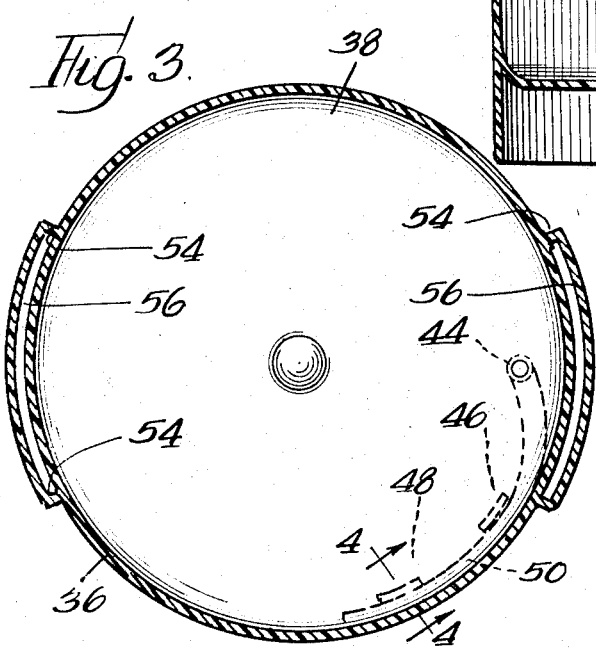
FIGURE 3 is a cross-sectional view taken on line 3—3 of FIGURE 2.
Figure 4:
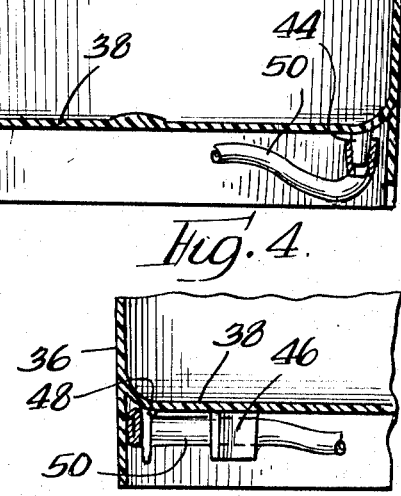
FIGURE 4 is an enlarged cross-sectional view taken on line 4—4 of FIGURE 3, showing a tube mounted in a tube holder.

As may be seen in FIGURE 2, the cover 34, which is also made of molded polypropylene, generally includes a domed closure 78 which has a vent plug 80 positioned in a vent aperture 82 in the central portion of the closure. An annular internal seal 84 is formed integral with the interior surface of the closure and is adapted for engagement with the interior surface of the side wall 36. The cover also includes an annular exterior seal 86 which is formed integral with the outer periphery of the closure and is adapted for sealing and locking engagement with the lock ring 42. A pair of locking ears 88 is formed integral with the outer periphery of the exterior seal 86, and the locking ears contain slots 90 for reasons which will become apparent hereinafter. Formed integral with the outer periphery of the closure 78 is a stacking ring 92 which stacking ring contains a plurality of drain slots 94 to allow liquid to flow off the top of the cover.

Looking now to FIGURES 12 through 15, the construction of the internal seal 84 may be clearly seen therein. The internal seal 84 includes a flexible tapered conical wall 96 in which the larger end of the conical wall is formed integral with the interior surface of closure 78. A resilient conical seal support 98 is formed integral with the tapered conical wall 96 and the smaller end of the conical seal support is formed integral with the smaller end of the conical wall. Formed integral with the larger end of the conical seal support is a resilient annular cylindrical seal 100 which is adapted for sealing engagement with the interior surface of side wall 36.

The exterior seal 86 includes a ring-like plane surface 102 and a first conical surface 104 which has its smaller end intersecting the plane surface 102. A second conical surface 106 has its larger end intersecting the larger end of the first conical surface 104, while a third conical surface 108 has its smaller end intersecting the smaller end of second conical surface 106 at an obtuse angle. It should also be noted that the angle between the first and second conical surfaces is also an obtuse angle as well as the angle between the first conical surface and the plane surface 102. The bottom of the exterior seal defines a plane surface 110 and an outer periphery 112 is perpendicular to the plane surface 110 except for that portion which includes the ears 88.

As was mentioned above, the cover includes a stacking ring 92 which is formed integral with the upper portion of the closure 78. The stacking ring 92 and the exterior seal 86 have a common conical deflecting surface 114, for reasons which will become apparent hereinafter.

The construction of the vent plug 80 may be best seen in FIGURES 7 and 8. The vent plug is a unitary piece of molded polypropylene. However, any other suitable material may be used. The vent plug includes a body 116 which has a handle 118 formed integral therewith. Also formed integral with the body 116 is a plug 120, which includes a stem 122 and a head 124. The plug 120 includes an axial plug aperture 126 which extends through the head, stem, and a portion of the body 116 in order to increase the resilience of the plug 120.

It may be appreciated that the vent plug may be simply inserted into the vent aperture 82 by forcing the head 124 into the aperture 82 so that the head partiallly collapses and allows the stem 122 to be positioned in the aperture. Once the plug is in position, the resilience of the head 124 causes the head to expand and thereby lock the vent plug into position, sealing the vent aperture.

The container 30 is used in the following manner. For the purposes of illustration it will be assumed that the vessel 32 is filled with milk. However, it is readily apparent that the vessel may be filled with any other suitable material. Prior to the filling of the vessel, the vessel and cover are cleaned. The tube 50 is then mounted on the tapered spout 44 and the tube is locked into position between the side wall 36 and flanges 46 and 48 adjacent to the bottom 38. The vessel is then filled in a conventional and well-known means.

The cover 34 has its vent aperture 82 sealed by the vent plug 80 as described above. The cover is locked onto the vessel 32. It should be noted that the cover is doubly sealed in relation to the vessel.

The sealing of the cover to the vessel may be best seen in FIGURES 12 and 13. As the cover 34 is moved toward the vessel 32 the annular seal 100 moves relative to the interior conical surface of the side wall 36 until it engages the side wall. Further movement of the cover toward the vessel causes the annular seal 100 to be compressed and to deflect the seal support. Further movement of the cover toward the vessel causes the third conical surface 108 to engage the upper conical surface 74 of the vessel so that as the cover moves toward the vessel the annular exterior seal is expanded and at the same time lock ring 42 is contracted. Further movement of the cover toward the vessel causes the third conical surface to pass the upper conical surface 74 so that the compressed lock ring and the expanded exterior seal snap into engagement thereby causing the second conical surface 106 to engage the lower conical surface 76, to pull plane surface 102 into sealing engagement with the ring-like plane surface 72 of the vessel. The exterior seal in cooperation with the lock ring thereby provides a dual function of locking the cover to the vessel as well as providing a seal between the cover and the vessel. It should be noted that there is no opportunity for foreign particles to enter the vessel inasmuch as the resilience of the exterior seal and the lock ring hold the conical surfaces in tight engagement with each other, as seen in FIGURE 13. Furthermore, there is a seal between the annular seal 100 and the interior of the side wall 36 so that no fluid may pass thereby. It should be appreciated that if for any reason the seal between seal 100 and the internal surface of side wall 36 should fail, the additional seal between the lock ring and the exterior seal provides a secondary seal.

Once the cover is in position, the handles 58 may be attached to the cross bars 56. However, the container may be used without the handles. It is apparent that the optional use of the handles provides an improved construction for the container since the user of the container need not attach the handles if the particular use of the container does not require handles. It may be also appreciated that once the handles are mounted on the vessel, they need not be removed with each usage or cleaning.

After the cover is locked to the vessel, a conventional metallic container seal, such as seal 128, is passed through slot 90 of ear 88 and around cross bar 56, to seal closed the container in accordance with health regulations.

The filled and sealed containers are then ready for storage. It is important to note that the subject containers may be stacked one on top of the other. Inasmuch as the side walls 36 of the containers are conical, the lower end of the container is readily positionable within the stacking ring 92 of the cover as may be seen in FIGURE 17. It is important to note that the stacking of one container on top of another container helps to improve the seal between the cover and vessel of the lower container, by applying a greater force between the plane surfaces 102 and 72. The stacking ring 92 prevents the upper container from sliding relative to the lower container.

The instant container construction provides an important advantage in transporting the containers in a vehicle, such as, a truck, which has a tendency to cause containers to shake and jump. By using the present cover construction, one container may not pry open an adjacent container because of shaking or tilting of the containers on a flat surface. It may be observed that the deflecting surface 114 extends inwardly of the cover so that the narrower end is adjacent to the top. It may be appreciated that if one container were to tilt and the adjacent containers were to tilt also, so that one edge of the first container were higher than the adjacent edge of the second container and the second container were to come into engagement with the first container, the deflecting surface 114 would engage the edge defined by the plane surface 110 and outer periphery 112 so that there would be no tendency for the cover of the first container to be pried upward and off the vessel.

The container 30 may be emptied in either of two ways. If the container is to be emptied by removing the cover and tilting the vessel, the present construction of the container simplifies the removal of the cover. It is only necessary to press down on the dome closure, thereby expanding the exterior seal 84 so that the outer and lower edge of the exterior seal may be pried upward as shown in FIGURE 15, to disengage the second conical surface 106 from the lower conical surface 76, thereby moving the cover away from the vessel to disengage the annular seal 100 from the internal surface of the side wall 36.

The other method of draining the container is to disengage the tube 50 from the flanges 46 and 48 and to bring the tube out from within the side wall 36 through slot 52. The tube is then positioned in a conventional valve and the sealed end is cut off to allow the liquid to be drained from the vessel. However, in order for free flow of liquid from the vessel to occur, the vent plug 80 is removed from the vent aperture 82. The removal of the vent plug is simply accomplished by raising the body 116 by handle 118 relative to the closure 78 as shown in FIGURE 8 to pull the head 124 through the vent aperture.

Once the milk has been drained from the vessel, the container is returned to the dairy for cleaning and storage. It should be noted that since the side walls of the vessels are tapered, the vessels nest within each other as shown in FIGURE 16. The stacking stops 40 limit the nesting of the vessels relative to each other, thereby preventing the exterior surface of the side wall from engaging with the interior surface of the side wall to limit dirtying of the interior surface of the side wall and to prevent vessels from becoming stuck within each other.

The construction of the covers is also such that the covers stack relative to each other in view of the fact that the internal seals of the covers fit within the stacking rings of each other, thereby allowing the covers to be easily stacked. Thus, the internal seals provide the dual function of providing a seal as well as a convenient stacking means for the covers.

From the foregoing, it may be seen that the subject containers may be conveniently and efficiently stored in a dairy or other food processing plant. The instant containers may be easily handled because of their light weight and corrosion resistance, and may also be readily cleaned by conventional means.

Although a specific embodiment of the instant invention has been shown and described in detail above, it is readily apparent that those skilled in the art may make various modifications and changes, such as, changing specific construction of the seals or changing materials, as well as making other changes, without departing from the spirit and scope of this invention. It is to be expressly understood that the instant invention is limited only by the appended claims.

What is claimed is:

1. A container comprising, in combination, a flexible unitary vessel having a conical side wall, a bottom formed integral with the interior surface of a narrower portion of the side wall and being spaced from the end of the side wall, a stacking stop formed integral with the exterior surface of the side wall and being positioned adjacent to the larger end of said side wall, an annular lock ring formed integral with the larger end of the side wall, a flexible unitary cover including a closure engageable with the vessel, an annular flexible internal seal formed integral with the closure, said internal seal includes a conical seal wall formed integral with the closure and having the larger end of the conical seal wall adjacent to the closure, a conical seal support formed integral with the conical seal wall and having the smaller end of the seal support adjacent to the smaller end of the conical seal wall, and an annular cylindrical seal formed integral with the larger end of the conical seal support, whereby the annular seal is sealingly engageable with the interior surface of the vessel side wall and the resilience of the conical seal wall and conical support holds the annular cylindrical seal in flexed tight sealing engagement with the conical side wall of the vessel, and an annular flexible exterior seal formed integral with the closure and being removably sealably engageable with the lock ring of the vessel to lock the cover to the vessel and to provide a second seal between the vessel and the cover.

2. A container as defined in claim 1 wherein the stacking stop includes two pairs of ribs, each pair of ribs is formed integral with the exterior surface of the side wall and each pair is opposite the other pair, and a cross bar formed integral with each pair of ribs and spaced from the side wall.

3. A container as defined in claim 2, wherein a pair of opposed slotted ears is formed integral with the annular exterior seal, whereby a container seal is engageable with an ear and a cross bar to seal closed the container.

4. A container as defined in claim 2 including a U-shaped apertured half-handle having a recess in the arms of the U and said recess receiving one of said cross bars and a U-shaped pronged half-handle releasably connected to the apertured half-handle and having a recess in the arms of the U receiving the cross bar.

5. A fluid food product container as defined in claim 1 having a spout formed integral with the bottom to provide a means for draining a liquid from the vessel, and a tube lock flange formed integral with the bottom and positioned adjacent to the interior of the side wall to receive and to hold a flexible tube between the side wall and the flange.

6. A fluid food product container as defined in claim 5 having a slot formed in a portion of the side wall adjacent to the spout.

7. A container as defined in claim 1 wherein the lock ring includes a ring-like plane surface substantially perpendicular to the axis of the vessel, an upper conical surface having the narrower portion of the upper conical surface adjacent to the plane surface, and a lower conical surface having its narrower portion adjacent to the vessel side wall and defining an obtuse angle with the upper conical surface, whereby the upper and lower conical surfaces are sealably and lockably engageable with the annular flexible exterior seal.

8. A container as defined in claim 1 wherein the closure includes a vent aperture and vent seal closing said vent aperture, said vent seal including a vent body, a stem formed integral with the body and positioned in the vent aperture, a flexible head formed integral with the stem and being engageable with the interior surface of the closure, and a handle formed integral with the body for removing the vent seal from the vent aperture.

9. A container as defined in claim 1 having a stacking ring formed integral with the closure and being adapted to receive the smaller end of a vessel and the internal seal of a cover.

10. A container as defined in claim 1 wherein the closure is domed and having the dome extending away from the vessel.

11. A flexible unitary cover for use in a container comprising, a closure having a circular outline, an annular flexible exterior seal formed integral with the outer periphery of the closure, an annular flexible internal seal formed integral with the closure, said internal seal includes a tapered conical seal wall formed integral with the closure and having the larger end of the conical seal wall adjacent to the closure, a resilient conical seal support formed integral with the conical seal wall and having the smaller end of the seal support adjacent to the smaller end of the conical seal wall, and a resilient annular cylindrical seal formed integral with the larger end of the conical seal support, and a stacking ring formed integral with the closure on the side of the closure opposite the side having the internal seal.

12. A flexible unitary cover as defined in claim 11 wherein the annular flexible exterior seal includes an annular plane surface adjacent to the internal seal, a conical surface intersecting the annular plane surface with the smaller end of the conical surface adjacent to the plane surface, a second conical surface intersecting the first-mentioned conical surface at an obtuse angle and having the larger end of the second conical surface adjacent to the first-mentioned conical surface, and a third conical surface intersecting the second conical surface at an acute angle and having the smaller end of the third conical surface adjacent to the second conical surface.

13. A flexible unitary cover as defined in claim 11 wherein the closure is domed and the dome extends away from the side which has the internal seal formed integral therewith.

14. A flexible unitary cover as defined in claim 11 wherein the stacking ring has a plurality of drain slots formed therein to allow a liquid to drain off the cover.

References Cited

UNITED STATES PATENTS

| | | |
|---|---|---|
| D. 164,540 | 9/1951 | Yates. |
| 2,605,945 | 8/1952 | Dechar 220—94 X |
| 2,695,115 | 11/1954 | Roop 220—97 |
| 2,972,432 | 2/1961 | Flack et al. 220—60 |
| 2,975,947 | 3/1961 | Pellett 222—546 |
| 3,005,572 | 10/1961 | Gustafson et al. 220—94 |
| 3,106,308 | 10/1963 | Kazimier 220—94 |
| 3,111,240 | 11/1963 | Whitton 20—60 X |
| 3,137,415 | 6/1964 | Faunce 222—183 |
| 3,181,743 | 5/1965 | Libit et al. 222—538 X |
| 3,190,537 | 6/1965 | Meinecke et al. 222—183 X |
| 3,212,681 | 10/1965 | Weikert 222—562 X |
| 3,232,476 | 2/1966 | Cloyd 220—94 X |
| 3,258,178 | 6/1966 | Gran 220—60 X |
| 3,289,881 | 12/1966 | Gadung 220—60 |

SAMUEL F. COLEMAN, *Primary Examiner.*

UNITED STATES PATENT OFFICE
CERTIFICATE OF CORRECTION

Patent No. 3,378,177                                                              April 16, 1968

Carl A. Gran

It is certified that error appears in the above identified patent and that said Letters Patent are hereby corrected as shown below:

Column 1, line 29, "restraint" should read -- resistant --.
Column 2, line 13, after "readily" insert -- and --.

Signed and sealed this 12th day of August 1969.

SEAL)
Attest:

Edward M. Fletcher, Jr.                                 WILLIAM E. SCHUYLER, JR.
Attesting Officer                                                Commissioner of Patents